United States Patent
Choi et al.

(10) Patent No.: US 7,369,474 B2
(45) Date of Patent: May 6, 2008

(54) METHOD OF AND APPARATUS FOR DIFFERENTIATING BETWEEN WRITABLE DISC TYPES

(75) Inventors: Byoung-ho Choi, Taean-eup (KR); Yong-seock Yoon, Suwon-si (KR); Dong-jin Lee, Seongnam-si (KR); Soo-yul Jung, Taean-eup (KR); Joong-eon Seo, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 761 days.

(21) Appl. No.: 10/727,980

(22) Filed: Dec. 5, 2003

(65) Prior Publication Data

US 2004/0218497 A1 Nov. 4, 2004

(30) Foreign Application Priority Data

May 2, 2003 (KR) ............. 10-2003-0028170

(51) Int. Cl.
*G11B 7/00* (2006.01)
(52) U.S. Cl. .................. 369/53.23; 369/53.22
(58) Field of Classification Search ............ None
See application file for complete search history.

(56) References Cited

U.S. PATENT DOCUMENTS

| | | | |
|---|---|---|---|
| 5,764,610 A | 6/1998 | Yoshida et al. | |
| 5,959,955 A | 9/1999 | Choi | |
| 6,816,443 B1 | 11/2004 | Hwang | |
| 6,868,051 B2 | 3/2005 | Ogihara | |
| 7,054,243 B2 | 5/2006 | Bakx | |
| 2001/0006211 A1 | 7/2001 | Choi et al. | |
| 2002/0051412 A1* | 5/2002 | Kawashima et al. | 369/47.39 |
| 2002/0075780 A1* | 6/2002 | Ogihara | 369/53.23 |
| 2002/0126607 A1* | 9/2002 | Yamamoto et al. | 369/53.22 |
| 2002/0150017 A1 | 10/2002 | Ono et al. | |
| 2003/0123358 A1* | 7/2003 | Kanda et al. | 369/53.22 |
| 2004/0052181 A1* | 3/2004 | Tada et al. | 369/53.22 |
| 2004/0090894 A1* | 5/2004 | Kim et al. | 369/53.22 |

FOREIGN PATENT DOCUMENTS

| | | |
|---|---|---|
| CN | 1268736 | 10/2000 |
| EP | 0 784 321 | 7/1997 |

(Continued)

OTHER PUBLICATIONS

Office Action issued in European Patent Application No. 04252541.0 on Aug. 31, 2006.

(Continued)

*Primary Examiner*—Thang V. Tran
*Assistant Examiner*—Lixi Chow
(74) *Attorney, Agent, or Firm*—Stein, McEwen & Bui, LLP (57) ABSTRACT

A plurality of types of writable discs on which wobbles having a predetermined frequency containing absolute addresses and/or various pieces of information on the writable discs can be discriminated by controlling only focusing and using an amplitude of a wobble signal or a wobble PLL lock signal that has passed through a phase locked loop. Accordingly, a discrimination time can be reduced and a disc in an unrecorded state can also be discriminated.

11 Claims, 5 Drawing Sheets

FOREIGN PATENT DOCUMENTS

| | | |
|---|---|---|
| EP | 1 107 239 | 6/2001 |
| EP | 1 191 529 | 3/2002 |
| EP | 1 191 529 A2 | 3/2002 |
| JP | 9-198779 | 7/1997 |
| JP | 11-134719 | 5/1999 |
| JP | 2000-30353 | 1/2000 |
| JP | 2002-100041 | 4/2002 |
| WO | WO 03/046906 A1 | 6/2003 |

OTHER PUBLICATIONS

Office Action issued Jun. 6, 2006 in corresponding Japanese Patent Application No. 2004-127290.

Office Action issued in Taiwanese Patent Application No. 93109443 on Mar. 20, 2006.

Office Action issued in Chinese Patent Application No. 200410042154.3 on Oct. 14, 2005.

* cited by examiner

METHOD OF AND APPARATUS FOR DIFFERENTIATING BETWEEN WRITABLE DISC TYPES

CROSS-REFERENCE TO RELATED APPLICATION

This application claims the benefit of Korean Patent Application No. 2003-28170, filed on May 2, 2003 in the Korean Intellectual Property Office, the disclosure of which is incorporated herein in its entirety by reference.

BACKGROUND OF THE INVENTION

1. Field of the Invention

The present invention relates to disc discrimination in an optical disc system capable of performing recording on and/or reproduction from a plurality of types of discs, and more particularly, to a method and apparatus for determining the type of a writable disc.

2. Description of the Related Art

Figure 1:
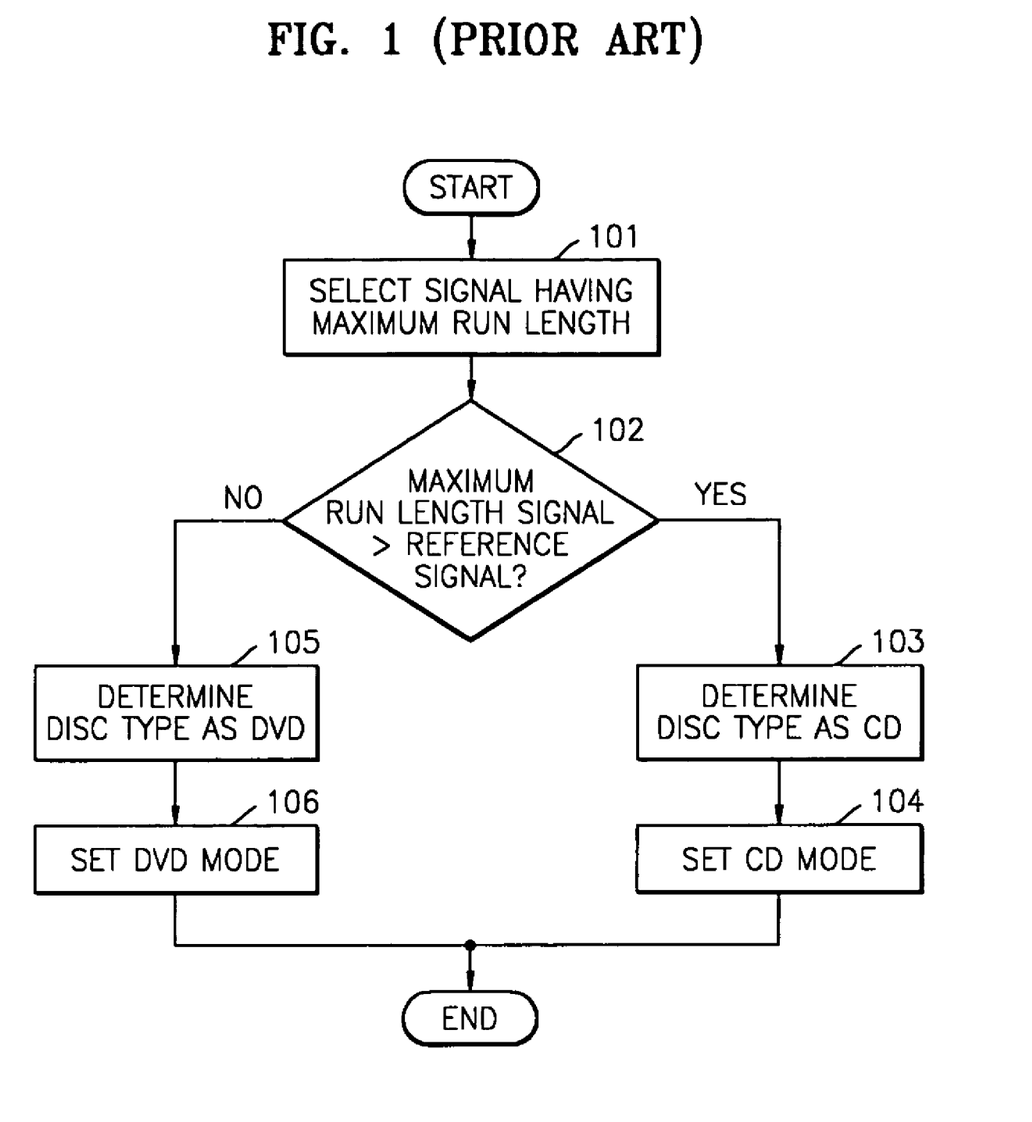
FIG. 1 is a flowchart of a conventional disc discriminating method.

FIG. 1 is a flowchart of a conventional disc discriminating method used in an optical disc system. The method is disclosed in Korean Patent Registration No. 176557 filed by the present applicant. Referring to FIG. 1, in operation 101, a maximum run length of an information signal read by rotating an optical disc at a constant velocity to control focusing is selected. In operation 102, the selected maximum run length signal is compared with a reference signal to determine whether the maximum run length signal is greater or less than the reference signal. If the maximum run length signal is greater than the reference signal, in operation 103, the optical disc is determined as a compact disc (CD), and in operation 104, a CD mode is set. If the maximum run length signal is less than the reference signal, in operation 105, the optical disc is determined as a digital versatile disc (DVD), and in operation 106, a DVD mode is set.

The conventional disc discriminating method discriminates whether an optical disc loaded in an optical disc system is a DVD or a CD. In case of a DVD, a track pitch and a pit length tend to be minimized to record a large amount of information in the same area. Thus, a signal detected from a pit has a high frequency in the DVD case and a detection time for the signal gets shorter. Therefore, a DVD can be distinguished from a CD using these characteristics. Such a signal can be detected from a pit when an optical spot passes on a recording surface of the optical disc due to focusing control. A pit signal having a maximum run length is selected from pit signals detected in such a way in order to minimize a discrimination error. A reference signal used for discriminating the type of disc is determined among maximum run length signals respectively detected from the DVD and the CD, and a signal read from a corresponding disc is compared with the reference signal to discriminate a DVD from a CD based on the comparison result.

SUMMARY OF THE INVENTION

The present invention provides a method of and apparatus for determining the type of a disc by controlling only focusing in an optical disc system capable of performing recording on and/or reproduction from a plurality of types of discs.

The present invention also provides a method of and apparatus for determining the type of a disc by controlling only focusing in an optical disc system capable of performing recording on and/or reproduction from both a DVD-writable (R)/rewritable (RW) and a DVD+R/RW.

The present invention also provides a method of and apparatus for determining the type of a writable disc although information is not recorded on the writable disc.

Additional aspects and/or advantages of the invention will be set forth in part in the description which follows and, in part, will be obvious from the description, or may be learned by practice of the invention.

According to an aspect of the present invention, a method of discriminating between a plurality of types of writable discs, the writable discs comprising wobbles having corresponding predetermined frequencies comprising absolute addresses and/or various pieces of information, the method comprising controlling a focus on a recording surface of one of the writable discs using a pickup unit, and using an amplitude of a wobble signal detected during the controlling of the focus to discern a type of the one writable disc from the plurality of types of writable discs.

According to another aspect of the present invention, a method of discriminating between a plurality of types of writable discs, the writable discs having wobbles with corresponding predetermined frequencies comprising absolute addresses and/or various pieces of information, the method comprising controlling a focus on a recording surface of one of the writable discs using a pickup unit, and differentiating the one writable disc from the plurality of types of writable discs using a wobble phase-locked loop signal that has passed through a phase-locked loop.

According to still another aspect of the present invention, a method of discriminating a type of a writable disc, the writable disc having wobbles having a predetermined frequency comprising absolute addresses and/or various pieces of information for use in an optical disc system comprising a pickup unit and a servo unit, the method comprising, with a default mode is set to a mode of any type of disc, controlling the servo unit in an on-focus state to adjust a focus on a recording surface of the writable disc using the pickup unit, detecting an amplitude of a wobble signal in the on-focus state, and, based on the comparison result, comparing the amplitude of the wobble signal with an amplitude of a reference wobble signal to determine if the one writable disc is the same type of disc corresponding to the default mode or another type of disc.

According to yet another aspect of the present invention, a method of determining a type of a writable disc, the writable disc including wobbles having a predetermined frequency comprising absolute addresses and/or various pieces of information on the writable disc for use in an optical disc system comprising a pickup unit and a servo unit, the method comprising, with a default mode is set to a mode of any type of disc, controlling the servo unit in an on-focus state to adjust a focus on a recording surface of the writable disc using the pickup unit, providing a sum time in an active section of a wobble phase-locked loop lock signal generated after passing through a phase-locked loop in the on-focus state, comparing the sum time in the active section or sections of the wobble PLL lock signal with a reference time, and determining, based on the comparison result, the type of the writable disc differentiated between one type of disc and another type of disc, where the active section corresponds to a variation in the wobble phase-locked loop lock signal as compared to a predetermined signal level.

According to yet another aspect of the present invention, a writable disc discriminating apparatus for an optical disc system which includes a pickup unit and a servo unit and which performs recording on and/or reproduction from a plurality of types of writable discs, the discs including wobbles having corresponding predetermined frequencies including absolute addresses and/or various pieces information, the writable disc discriminating apparatus including a servo controller that controls the servo unit in an on-focus state to adjust a focus on a recording surface of one of the writable discs using the pickup unit, and a discriminator that discerns the one writable disc from the plurality of types of writable discs in the on-focus state using an amplitude of a wobble signal.

According to yet another aspect of the present invention, a writable disc discriminating apparatus for an optical disc system which includes a pickup unit and a servo unit and which performs recording on and/or reproduction from a plurality of types of writable discs, the discs having wobbles having corresponding predetermined frequencies comprising absolute addresses and/or various pieces information, the writable disc discriminating apparatus including a servo controller that servo controller controls the servo unit in an on-focus state to adjust a focus on recording surfaces of the writable discs using the pickup unit, and a discriminator that discriminates the disc from the plurality of writable discs in the on-focus state using a wobble PLL lock signal that has passed through a phase locked loop.

BRIEF DESCRIPTION OF THE DRAWINGS

The above and other features and/or advantages of the present invention will become more apparent and more readily appreciated by describing in detail exemplary embodiments thereof with reference to the accompanying drawings in which.

DETAILED DESCRIPTION OF THE EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
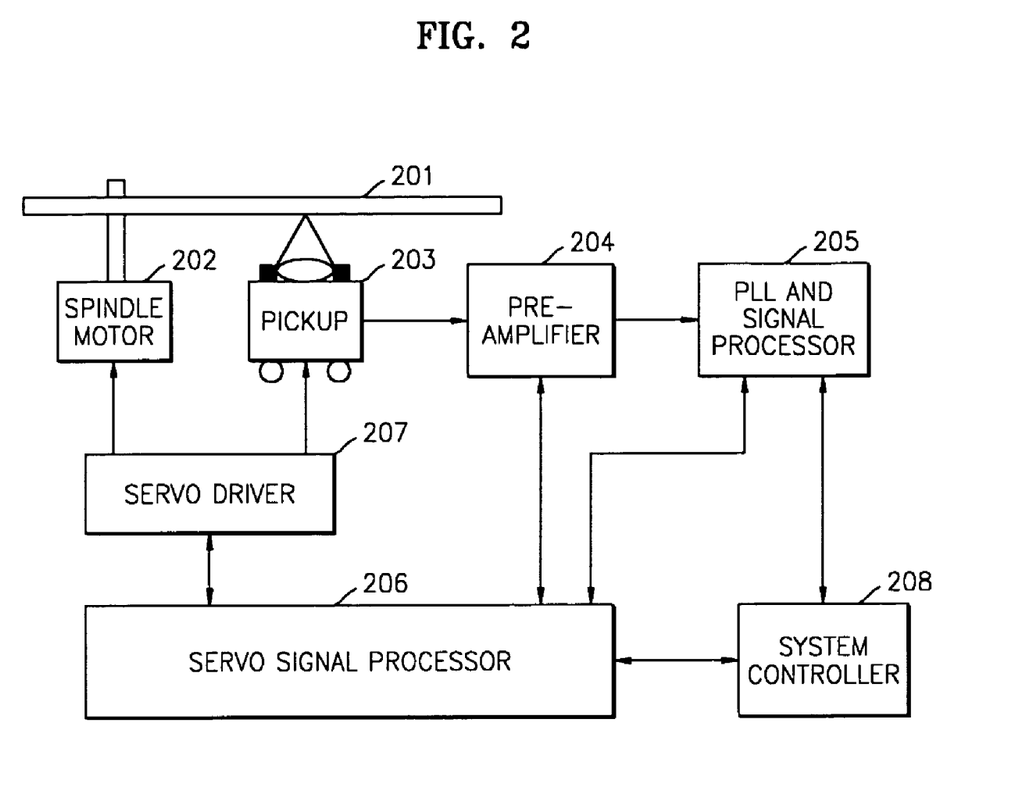
FIG. 2 is a block diagram of an optical disc system according to an aspect of the present invention.

FIG. 2 is a block diagram of an optical disc system capable of performing recording on and/or reproduction from a plurality of types of discs, according to an aspect of the present invention. The optical disc system includes a spindle motor 202 which rotates a writable and/or readable optical disc 201. A pickup unit 203 records information on and/or reproduces information from the optical disc 201. A pre-amplifier 204 processes a data signal, a servo signal, and like information read via the pickup unit 203. A phase locked loop (PLL) and signal processor 205 implements a PLL, an error correction, etc., to convert the data signal processed by the pre-amplifier 204 into actually effective information. A servo signal processor 206 generates a servo control signal, such as a focusing control signal, a tracking control signal, a high-speed search control signal, and so forth, using the servo signal output from the pre-amplifier 204. A servo driver 207 generates a servo drive signal for driving the spindle motor 202, a motor to drive the pickup unit 203, and a pickup transfer motor according to the servo control signal. A system controller 208 properly controls and manages the transmission of all the above signals.

Here, the servo signal processor 206 and the servo driver 207 may be collectively referred to as a servo controller. Also, the spindle motor 202, the motor to drive the pickup unit 203, and the pickup transfer motor may be collectively referred to as a servo unit.

The operation of the present invention will be explained with respect to a DVD-R/RW and a DVD+R/RW. However, it is understood that the invention can be used with other types of recording media.

Referring to FIG. 2, the transmission of signals in the optical disc system according to an aspect of the present invention will be first described. The pickup unit 203 is required to record information on and/or reproduce information from the optical disc 201. An optical signal read by the pickup unit 203 is converted into an electrical signal, and then the electrical signal is input to the pre-amplifier 204. The pre-amplifier 204 generates the servo signal necessary for controlling the pickup unit 203, processes signals necessary for recording information on and/or reproducing information from the optical disc 201, and provides the servo signal processor 206 with the servo signal so that the servo signal is used to control the motor for driving the spindle motor 202 and the pickup unit 203, the pickup transfer motor, and the like. The pre-amplifier 204 waveform-equalizes a radio frequency (RF) signal and then outputs the equalized signal to the PLL and signal processor 205. The PLL and signal processor 205 digitizes the equalized signal, corrects an error in the digitized signal through the PLL, and normally generates data. In order to accurately read data from the optical disc 201, the disc 201 is rotated at a constant linear velocity. Data can be read from the optical disc 201 by using, for example, a wobble signal formed on groove tracks of the optical disc 201 and with a predetermined frequency containing absolute addresses and/or various pieces of information.

In the present invention, it is possible to discriminate at least two types of discs. For example, it is possible to differentiate between a DVD-R/RW and a DVD+R/RW, by controlling only focusing to monitor a wobble signal. However, it is understood that it would be possible to differentiate between other types of discs using other embodiments of the present invention.

In other words, the pickup unit 203 controls an accurate focus on a recording surface of the optical disc 201 when an optical spot crosses a groove track of the optical disc 201 due to the deviation of the optical disc 201. A number of times the optical spot crosses the groove track depends on a deviation amount. When the optical spot crosses the groove track, the optical spot passes over a groove wobble of the optical disc 201 having a predetermined frequency. Then, the wobble signal is precisely detected.

Where the optical spot passes over a land track between the groove tracks, the wobble signal in the groove track may be 180° out of phase with a wobble signal in an adjacent track, which results in a failure to detect the wobble signal. However, even in this case, the detection of a wobble signal is possible according to known methods.

Thus, the wobble signal enables two types of discs to be discriminated. For instance, a DVD-R/RW has a wobble frequency of 186 channel bits. In contrast, a DVD+R/RW uses a wobble frequency of 32 channel bits. Thus, their wobble frequencies are 140.6 KHz and 817.5 KHz, respectively. Accordingly, when the optical disc 201 rotates at a speed of 1X and a central frequency of a band-pass filter (not explicitly shown), which detects a wobble signal from a DVD-R/RW, is set to be 140.6 KHz, a high wobble signal is detected from the DVD-R/RW. However, since a wobble signal detected from a DVD+R/RW has a different wobble frequency of 817.5 KHz from the central frequency of the band-pass filter, the wobble signal is not properly detected. As a result, it is easy to discriminate between the DVD-R/RW and the DVD DVD+R/RW.

Figure 3A:
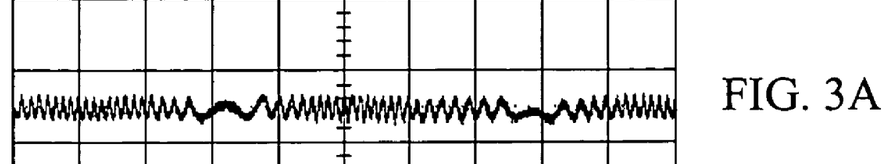
FIGS. 3A through 3F illustrate waveforms of signals generated by the components shown in FIG. 2.
Figure 3B:
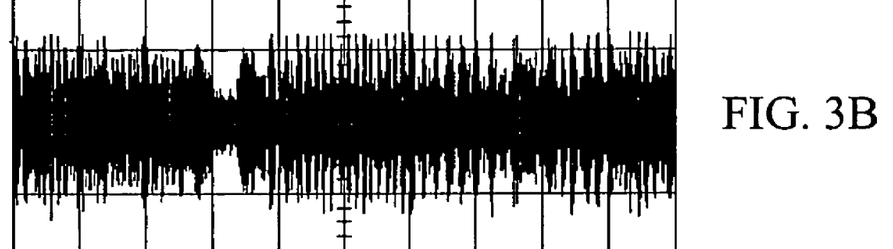
Figure 3C:
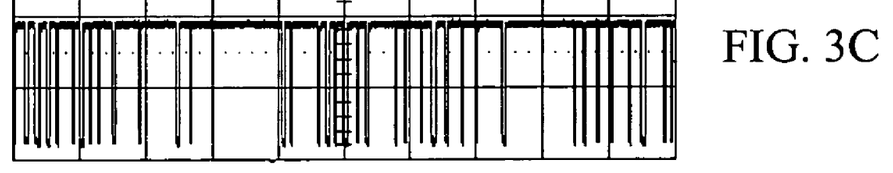
Figure 3D:
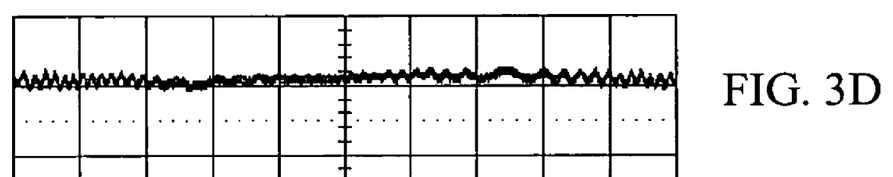
Figure 3E:
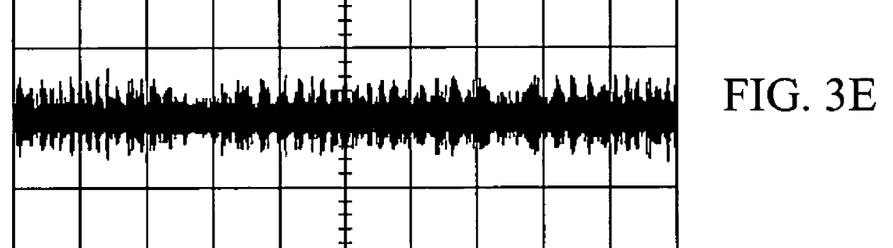
Figure 3F:
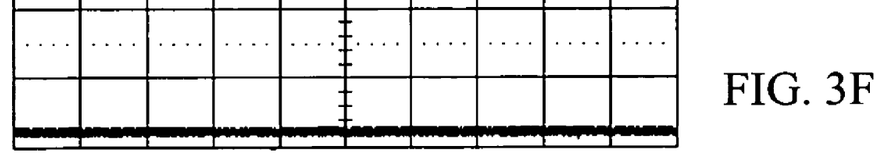

It is understood that the band-pass filter may be separately installed inside or in front of the PLL and signal processor 205 according to aspects of the invention FIGS. 3A through 3C show waveforms of signals generated by the components shown in FIG. 2 during reproduction from a DVD-R/RW. FIGS. 3D through 3F show waveforms of signals generated by the components shown in FIG. 2 during reproduction from a DVD+R/RW. FIG. 3A shows a sum signal of signals detected by a photodiode in the pickup unit 203 when controlling only focusing on a DVD-R/RW in a DVD-R/RW mode, FIG. 3B shows a wobble signal that has passed through the band-pass filter, and FIG. 3C shows a wobble PLL lock signal corresponding to the wobble signal having passed through the PLL. An amplitude of the wobble signal shown in FIG. 3B is greater than an amplitude of a wobble signal shown in FIG. 3E, and the wobble PLL lock signal of FIG. 3C is maintained at a high level in many sections.

A sum signal of signals detected by the photodiode in the pickup unit 203 when controlling only focusing on a DVD+R/RW in the DVD-R/RW mode is shown in FIG. 3D. The wobble signal that has passed through the band-pass filter is shown in FIG. 3E and the PLL lock signal is shown in FIG. 3F. The amplitude of the wobble signal used for the DVD+R/RW is lower than that of the wobble signal used for the DVD-R/RW, and the wobble PLL lock signal of FIG. 3F has no "high" sections. Thus, it is not difficult to discriminate two types of discs using the amplitude of a wobble signal and a wobble PLL lock signal.

Figure 4:
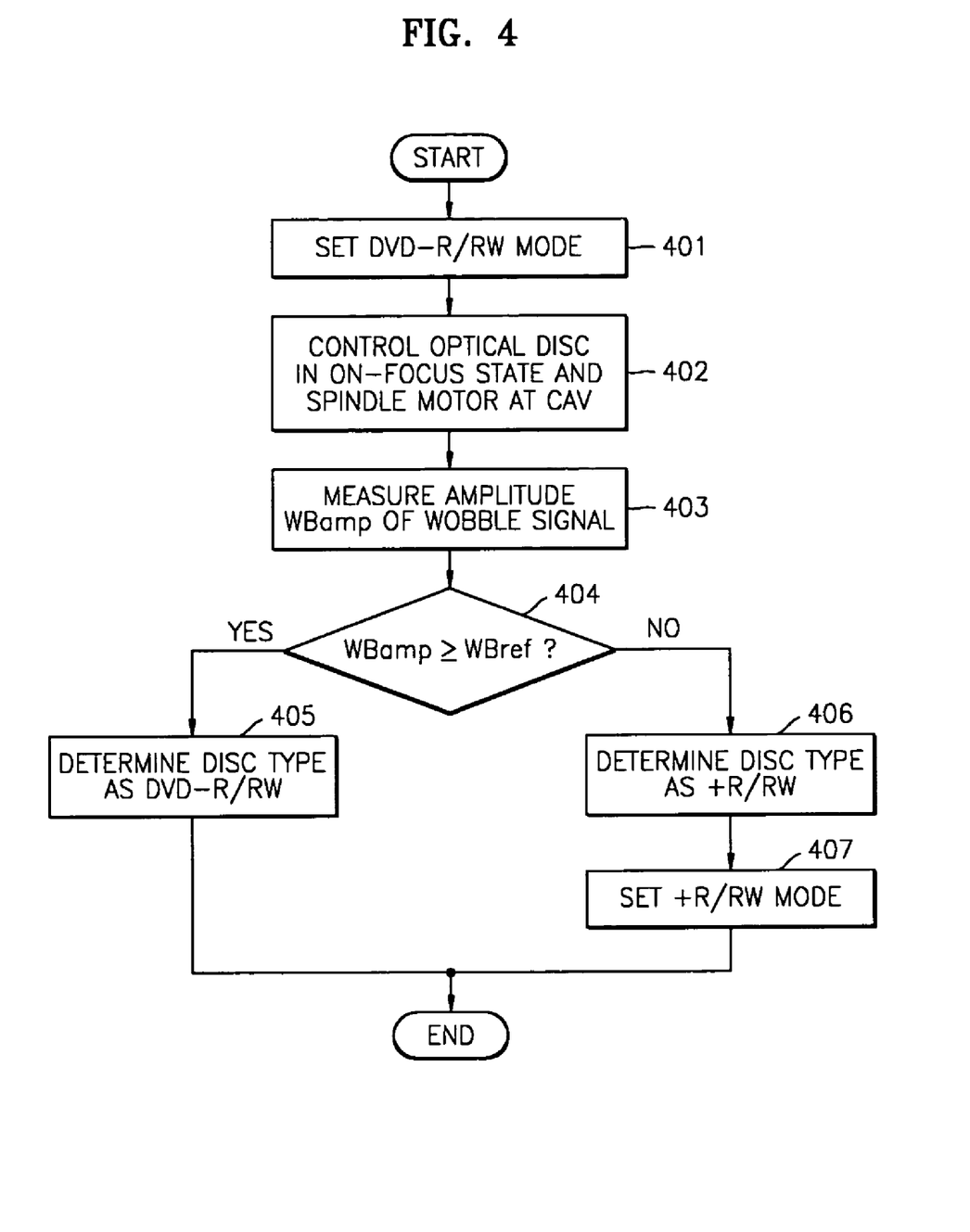
FIG. 4 is a flowchart of a method of discriminating a writable disc according to an embodiment of the present invention.

FIG. 4 is a flowchart of a method of discriminating a writable disc using the amplitude of a wobble signal performed by the controller 208 according to another embodiment of the present invention. Referring to FIG. 4, in operation 401, a DVD-R/RW mode is set. Alternatively, a DVD+R/RW mode may be set as a default mode in operation 401. In operation 402, the pickup unit 203 controls the optical disc 201 in a focus-on state to adjust a focus on the recording surface of the optical disc 201, and controls the spindle motor 202 at a constant angular velocity (CAV). In operation 403, the PLL and signal processor 205, which includes the band-pass filter having a predetermined wobble frequency (here, 140.6 KHz used for the DVD-R/RW) as a central frequency, measures an amplitude WBamp of a wobble signal. In operation 404, the amplitude WBamp of the wobble signal is compared with an amplitude WBref of a reference wobble signal. If the amplitude WBamp of the wobble signal is greater than or equal to the amplitude WBref of the reference wobble signal, in operation 405, a disc type is determined as a DVD-R/RW. If not, in operation 406, the disc type is determined as a DVD+R/RW, and a DVD+R/RW mode is set in operation 407.

Accordingly, when a disc type is determined as a DVD-R/RW or DVD+R/RW-family disc in an initial state, focusing is controlled. Also, if the disc mode is set to be a DVD-R/RW mode, the amplitude WBamp of a wobble signal is measured and then compared with the amplitude WBref of a reference wobble signal that is experimentally set. If the amplitude WBamp of the wobble signal is greater than the amplitude WBref of the reference wobble signal, the disc type is determined as a DVD-R/RW. If the amplitude WBamp of the wobble signal is less than the amplitude WBref of the reference wobble signal, the disc type is determined as a DVD+R/RW.

According to an aspect of the invention, the disc type may be determined using a ratio of the amplitude of the wobble signal shown in FIG. 3B to the sum signal of FIG. 3A for the DVD-R/RW and a ratio of the amplitude of the wobble signal FIG. 3E to the sum signal of FIG. 3D for the DVD+R/RW. In case of a disc in an unrecorded state, an average reflectivity drops, which may result in a variation in the amplitude of the wobble signal. However, since a ratio of the amplitude of a wobble signal to a sum signal does not generally vary, the type of disc in the unrecorded state can be further reliably discriminated.

Figure 5:
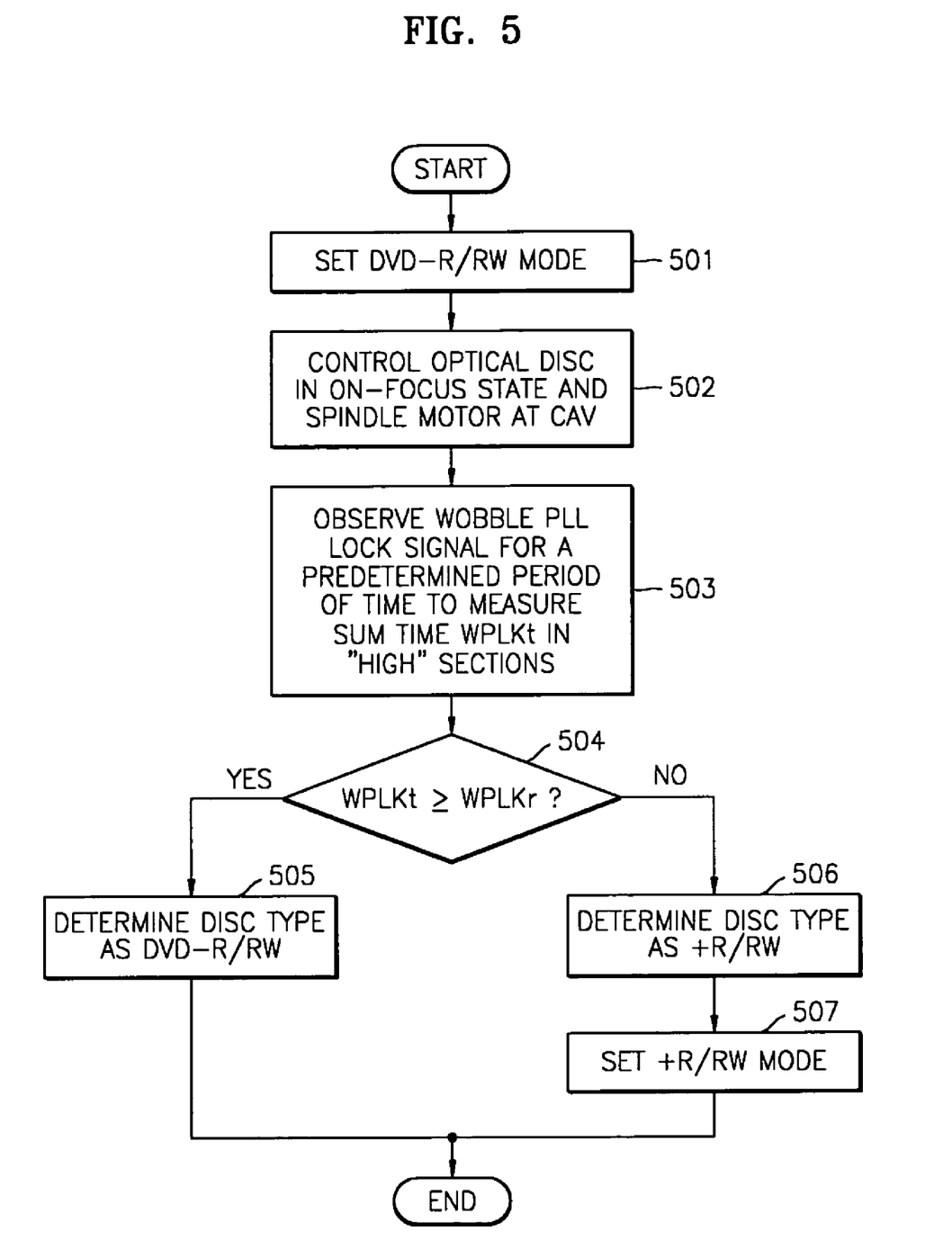
FIG. 5 is a flowchart of a method of discriminating a writable disc according to another embodiment of the present invention

FIG. 5 is a flowchart of a method of discriminating a writable disc using a wobble PLL lock signal performed by the controller 208 according to another embodiment of the present invention. Referring to FIG. 5, in operation 501, a DVD-R/RW mode is set. Alternatively, a DVD+R/RW mode may be set to a default mode in operation 501. In operation 502, the pickup 203 controls the optical disc 201 in an on-focus state to adjust a focus on the recording surface of the optical disc 201, and controls the spindle motor 202 at a CAV. In operation 503, a wobble PLL lock signal is observed for a predetermined period of time to measure a sum time WPLKt in a "high" section of the wobble PLL lock signal. The wobble PLL lock signal refers to a wobble signal which has been detected by the PLL and signal processor 205 having the band-pass filter having the predetermine wobble frequency (here, 140.6 KHZ used for the DVD-R/RW) as the central frequency and then passed through the PLL.

In operation 504, the sum time WPLKt in the "high" section of the wobble PLL lock signal is compared with a sum time WPLKr (hereinafter referred to as a reference time) in a "high" section of a reference wobble PLL lock signal that is experimentally set in advance. If the sum time WPLKt is greater than or equal to the sum time WPLKr, in operation 505, a disc type is determined as a DVD-R/RW. If not, in operation 506, the disc type is determined as a DVD+R/RW, and a DVD+R/RW mode is set in operation 507.

Accordingly, when a disc type is determined as a DVD-R/RW or a DVD+R/RW in an initial state, focusing is controlled, and then a disc mode is set to a DVD-R/RW mode. Thereafter, the sum time WPLKt in the "high" section of the wobble PLL lock signal is compared with the reference time WPLKr that is experimentally pre-set for a predetermined period of time, e.g., for a period of time for which a disc rotates one time, in order to reliably identify the wobble PLL lock signal. Next, if the sum time WPLKt is greater than the reference time WPLKr, the disc type is determined as a DVD-R/RW. In the opposite case, the disc type is determined as a DVD+R/RW.

In the disc discriminating methods presented in FIGS. 4 and 5, the same result can be obtained even if an initial mode is set to a DVD+R/RW mode.

As described above, according to an aspect of the present invention, a DVD-R/RW can be discriminated from a DVD+R/RW by controlling only focusing in an optical disc system capable of performing recording on and/or reproduction from a plurality of types of discs. Discrimination time can be reduced and a disc in an unrecorded state can also be discriminated, which results in an increase discrimination reliability.

Moreover, it is understood that the instant invention can be used with other types of non-recordable, recordable, and rewritable discs, as well as with next generation DVDs such as Blu-ray discs.

Additionally, it is understood that the methods in FIGS. 4 and 5 can be implemented using computer software encoded on a computer readable medium readable by a special purpose or general purpose computer. Moreover, it is understood that one or more of the processors 204, 205 and the system controller 208 can be implemented as a computer.

Although a few embodiments of the present invention have been shown and described, it would be appreciated by those skilled in the art that changes may be made without departing from the principles and spirit of the invention, the scope of which is defined in the claims and their equivalents.

What is claimed is:

1. A method of differentiating between a plurality of types of writable discs having wobbles with corresponding predetermined frequencies comprising absolute addresses and/or various pieces of information, the method comprising:
   controlling a focus of a light spot on a recording surface of one of the writable discs using a pickup unit; and
   discerning a type of the one writable disc from the plurality of types of writable discs using a ratio of an amplitude of a wobble signal detected while controlling the focus to a sum signal of signals detected by a photodiode in the pickup unit to discern the type of the one writable disc.

2. The method of claim 1, wherein the discerning the type of the one writable disc comprises using the amplitude of the wobble signal which has passed through a band-pass filter having a predetermined frequency.

3. A method of determining a type of a writable disc having wobbles with a predetermined frequency comprising absolute addresses and/or various pieces of information received by an optical disc system comprising a pickup unit and a servo unit, the method comprising:
   setting a default mode to a mode of any type of disc;
   controlling the servo unit in an on-focus state to adjust a focus of a light spot on a recording surface of the writable disc using the pickup unit;
   detecting an amplitude of a wobble signal in the on-focus state;
   using a ratio of the amplitude of the wobble signal to a sum signal of signals detected by a photodiode in the pickup unit to obtain a comparison result; and
   using the comparison result to determine if the writable disc corresponds to a type of disc corresponding to the default mode or another type of disc.

4. The method of claim 3, wherein the controlling of the servo unit comprises:
   controlling a spindle motor, which rotates the writable disc, at a constant angular velocity.

5. The method of claim 3, wherein the type of disc corresponding to the default mode is a DVD-R/RW and the another type of disc is a DVD+R/RW.

6. The method of claim 3, wherein the detecting the amplitude of the wobble signal comprises detecting the amplitude of the wobble signal using a band-pass filter having a predetermined frequency.

7. A writable disc discriminating apparatus for use in an optical disc system which comprises a pickup unit and a servo unit and which performs recording on and/or reproduction from a plurality of types of writable discs having corresponding wobbles with respective predetermined frequencies comprising absolute addresses and/or various pieces information, the writable disc discriminating apparatus comprising:
   a servo controller that controls the servo unit in an on-focus state to adjust a focus of a light spot on a recording surface of one of the writable discs using the pickup unit; and
   a discriminator that uses a ratio of an amplitude of a wobble signal detected while in the on-focus state to a sum signal of signals detected by a photodiode in the pickup unit to determine a type of the one writable disc differentiated from the plurality of types of writable discs.

8. The apparatus of claim 7, wherein the discriminator comprises a band-pass filter that passes only a predetermined wobble frequency and that detects the wobble signal.

9. The apparatus of claim 7, wherein the servo controller controls a spindle motor, which rotates the writable discs in the on-focus state, at a constant angular velocity.

10. The apparatus of claim 7, wherein one type of the writable disc among the plurality of types of writable discs is a DVD-R/RW and another type of the writable disc is a DVD-R/RW.

11. The apparatus of claim 8, wherein the discriminator comprises:
   a signal processor that measures the amplitude of the wobble signal; and
   a system controller that compares the amplitude of the wobble signal with an amplitude of a reference wobble signal to differentiate the disc from the plurality of types of discs.

* * * * *

UNITED STATES PATENT AND TRADEMARK OFFICE
CERTIFICATE OF CORRECTION

| | | |
|---|---|---|
| PATENT NO. | : 7,369,474 B2 | Page 1 of 1 |
| APPLICATION NO. | : 10/727980 | |
| DATED | : May 6, 2008 | |
| INVENTOR(S) | : Byoung-Ho Choi et al. | |

It is certified that error appears in the above-identified patent and that said Letters Patent is hereby corrected as shown below:

Column 8, line 39, change "DVD-R/RW" to --DVD+R/RW--.

Signed and Sealed this

Eighth Day of July, 2008

JON W. DUDAS
*Director of the United States Patent and Trademark Office*